(12) United States Patent
Kabatzke et al.

(10) Patent No.: US 7,663,260 B2
(45) Date of Patent: Feb. 16, 2010

(54) METHOD AND APPARATUS FOR THE OPERATION OF A WIND ENERGY PLANT IN THE POWER-LIMITED OPERATION

(75) Inventors: Wolfgang Kabatzke, Geesthacht (DE); Mark Jurkat, Norderstedt (DE); Ulrich Harms, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 325 days.

(21) Appl. No.: 11/835,608

(22) Filed: Aug. 8, 2007

(65) Prior Publication Data

US 2008/0116690 A1 May 22, 2008

(30) Foreign Application Priority Data

Nov. 16, 2006 (DE) .................... 10 2006 054 768

(51) Int. Cl.
 *H02P 9/00* (2006.01)
(52) U.S. Cl. .................. 290/44; 290/55; 322/19
(58) Field of Classification Search ............ 290/43, 290/44, 54, 55; 322/19, 37
See application file for complete search history.

(56) References Cited

U.S. PATENT DOCUMENTS

| | | | |
|---|---|---|---|
| 5,652,485 A * | 7/1997 | Spiegel et al. ............. 318/147 |
| 6,137,187 A | 10/2000 | Mikhail et al. | |
| 6,856,041 B2 * | 2/2005 | Siebenthaler et al. ......... 290/44 |
| 7,231,282 B2 | 6/2007 | Schubert et al. | |
| 7,456,510 B2 * | 11/2008 | Ito et al. ........................ 290/44 |
| 7,511,385 B2 * | 3/2009 | Jones et al. .................... 290/43 |
| 7,528,496 B2 * | 5/2009 | Fortmann ..................... 290/44 |
| 2007/0154311 A1 * | 7/2007 | Kabatzke et al. ................ 416/1 |
| 2008/0042441 A1 * | 2/2008 | Kabatzke ...................... 290/44 |
| 2009/0193894 A1 * | 8/2009 | Kabatzke ...................... 73/510 |
| 2009/0212565 A1 * | 8/2009 | Kabatzke et al. .............. 290/44 |

OTHER PUBLICATIONS

Eric Hau, Wind Turbines: Fundamentals, Technologies, Application, Economics, 2nd ed. (Springer-Verlag 2006), pp. 269-279.
E. Muljadi and C. P. Butterfield, "Pitch-Controlled Variable-Speed Wind Turbine Generation," Industrial Applications Conference, 1999, Conference Record of the Thirty-Fourth IAS Annual Meeting, Phoenix, AZ, Oct. 3-7, 1999 (IEEE, NJ, Oct. 3, 1999), pp. 323-330.
E. L. Van Der Hooft et al., "Wind Turbine Control Algorithms," ECN Literature Review, Dec.1, 2003, pp. 1-89.

* cited by examiner

*Primary Examiner*—Nicholas Ponomarenko
(74) *Attorney, Agent, or Firm*—Young Basile

(57) ABSTRACT

A method and apparatus for operating a wind energy plant with a rotor blade control, a torque control and a control unit. A power limited mode of operation presets a desired value for the fed power, which is smaller than the rated value for the plant. On a threshold rotational speed, the torque is lowered through the torque control such that the preset desired value for the power is not exceeded. The threshold rotational speed, depending on the preset desired value for the moment $(M_{desired})$, is set to a value smaller than the rated value for the rotational speed.

20 Claims, 2 Drawing Sheets

METHOD AND APPARATUS FOR THE OPERATION OF A WIND ENERGY PLANT IN THE POWER-LIMITED OPERATION

CROSS-REFERENCE TO RELATED APPLICATION

This application claims priority from German patent application No. 10 2006 054 768.3 filed on Nov. 16, 2006, which is incorporated herein in its entirety by reference.

TECHNICAL FIELD

The invention is related in general to a method and apparatus for controlling a wind energy plant in a power-limited mode of operation, which is also called a power-restricted operation.

BACKGROUND

In addition to the standard operation in which a wind energy plant delivers its power according to the available wind up to a possible maximum power, a wind energy plant can also be operated in a power-limited way. This mode of operation is particularly important where several wind energy plants are embraced in one wind farm and control of the power from the wind farm has to take place, like in a power station. In this, the controls by the wind farm or the electric utility preset a desired value for the maximum power to be fed by the wind energy plant in the power-limited mode of operation, particularly for the maximum non-reactive power to be fed.

BRIEF SUMMARY OF THE DISCLOSURE

Various embodiments of a method and apparatus for controlling a wind energy plant in a power-limited mode of operation are described here. According to one embodiment of a method for operating a wind energy plant taught herein, the wind energy plant includes a generator, a rotor blade and a generator rotor coupled between the generator and the rotor blade and has a rated output power value in a standard operation mode and has a power-limited operation mode. The method comprises, for example, setting a threshold rotational speed of the generator rotor to a value smaller than a rated value for a rotational speed, the threshold rotational speed depending on a desired value for a moment associated with a desired output power value and the desired output power value being smaller than the rated output power values and controlling a generator torque in the power-limited operation mode below the threshold rotational speed of the generator rotor such that the desired output power value is not exceeded.

One example of an apparatus for operating such a wind energy plant includes means for setting a threshold rotational speed of the generator rotor to a value smaller than a rated value for a rotational speed, the threshold rotational speed depending on a desired value for a moment associated with a desired output power value and the desired output power value being smaller than the rated output power value. This apparatus also includes means for controlling a generator torque in the power-limited operation mode below the threshold rotational speed of the generator rotor such that the desired output power value is not exceeded.

Another apparatus for operating a wind energy plant as taught herein includes, for example, a control unit configured to set a threshold rotational speed of the generator rotor to a value smaller than a rated value for a rotational speed, the threshold rotational speed depending on a desired value for a moment associated with a desired output power value and the desired output power value being smaller than the rated output power value. The control unit is further configured in this example to control a generator torque in the power-limited operation mode below the threshold rotational speed of the generator rotor such that the desired output power value is not exceeded through instructions provided to a torque control of the wind energy plant.

Advantageous features of these and other embodiments of the invention are described in additional detail hereinbelow.

BRIEF DESCRIPTION OF THE DRAWINGS

The description herein makes reference to the accompanying drawings wherein.

DETAILED DESCRIPTION

Embodiments of the invention taught herein operate a wind energy plant in the power-limited operation that controls the wind energy plant reliably with respect to torque and rotational speed even in this mode of operation. According to known wind energy plants, a plant can be operated even in the power-limited operation with rotational speeds that correspond to the standard operation. This can result in rotational speeds that are too high for the generated power. In this way, unnecessary noise generation can occur. Further, it has proven that in the power-limited operation wind energy plants with a torque control and a rotor blade control can adopt operating states with respect to rotational speed and torque that lead to unnecessary stress of the wind energy plant and can be controlled only with difficulty.

Figure 1:
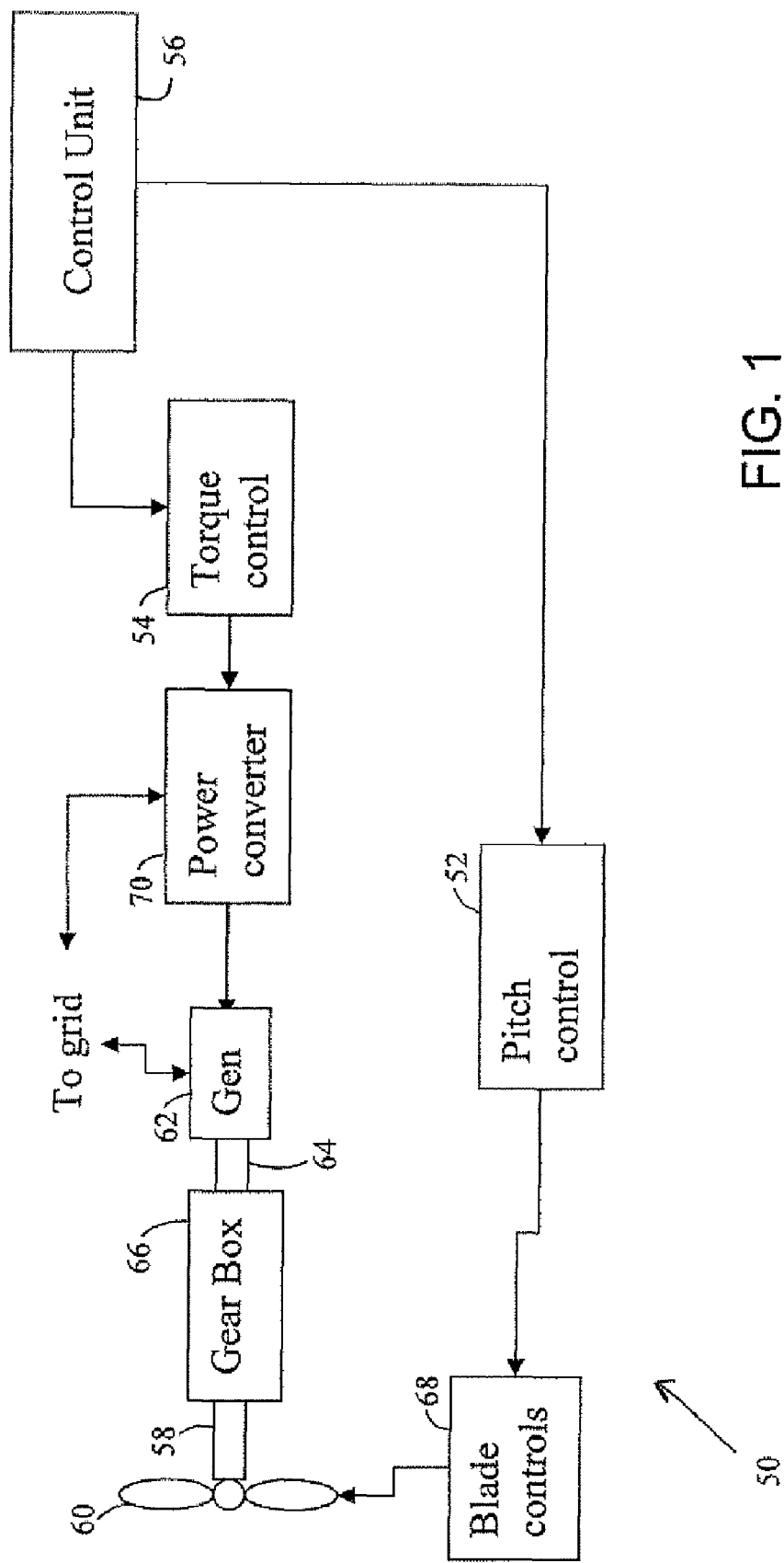
FIG. 1 is a simplified block diagram of a wind energy plant and its control system.

Embodiments of the invention are directed towards operation of a wind energy plant 50 that has a rotor blade (or pitch) control 52, a torque control 54 and a control unit 56 such as that shown in FIG. 1. The wind energy plant 50 is started in windy conditions from a start-up wind rotational speed and is shut off again at high wind in order to prevent mechanical overload. The wind speed can be detected or calculated by known methods. For example, an anemometer is a common device for measuring wind speed, while methods are known to calculate wind speed from the rotational speed of the blade rotor shaft 58 and the power produced.

The wind energy plant 50 is a pitch-controlled wind power plant that operates at variable rotational speeds. Using pitch control 52, the blade pitch of each rotor blade 60 is adjusted about its longitudinal axis (called "pitching" the blade) responsive to blade controls 68, such as hydraulically-controlled actuators as are known in the art. Additional discussion of control of the rotor blades 60 can be had by referring to E. Hau, *Wind Turbines: Fundamentals, Technologies, Application, Economics,* 2nd ed. (Springer-Verlag 2006), pp. 269-279. At different blade pitches, the respective rotor blade 60 collects a different torque from the wind.

In FIG. 1, for example, the generator 62 of the wind energy plant 50 is an induction generator controlled by the power converter 70. Such wind energy plants are shown in, for example, U.S. Pat. Nos. 6,137,187 and 7,231,282 B2. Of course, the invention can be implemented in other wind energy plant designs.

Generally, two modes of operation of such a wind energy plant 50 are known. The first mode is partial load operation, in which the rotational speed of the rotor shaft 58 (also called the rotor herein) is regulated by setting the torque using the torque control 54. In partial load operation, the pitch of each rotor blade 60 is typically set at an angle that generates the highest drive torque for the rotor 58. Counter-torque is generated by a generator 62 having a generator rotor 64 coupled to the rotor 58 through a gearbox 66. The generator is controlled in response to torque control 54 commands to a power converter 70.

The second mode is full load operation in which the rotational speed of the rotor 58 is regulated by the pitch control 52. Aerodynamic efficiency of the blades deteriorates as a result of pitching the blades in order to prevent system overload when the torque available from the generator reaches a maximum value and can no longer be used to control the rotor speed.

Although the pitch control 52 and torque control 54 are separately illustrated, they can be implemented as one microcomputer or the like including a central processing unit (CPU), input and output ports (I/O), random access memory (RAM), keep alive memory (KAM), a common data bus and read-only memory (ROM) as an electronic storage medium for executable programs and stored values to control operation of the power converter 70 and the blade controls 68. In addition, the functions of the pitch control 52, the torque control 54, or both, can be implemented within the control unit 56.

According to the teachings herein, the control unit 56 presets a desired value for the power to be fed by the wind energy plant 50 and in doing so can trigger a power-limited mode of operation. The control unit 56 can, for example, generate the desired value itself based on wind and system conditions. Alternatively, the control unit 56 can receive instructions from farm control of the wind energy plant and/or a network monitoring system of the electric utility. These external instructions, including presetting of the desired value, can occur automatically via data communication or can be transmitted manually by an instruction to an operator of the control unit 56. The control unit 56 generally incorporates, inter alia, a microcomputer or the like, which includes a CPU, I/O, RAM, KAM, a common data bus and ROM as an electronic storage medium for executable programs and stored values described herein. That is, generally the methods of operating the wind energy plant 50 taught herein can be performed by the control unit 56 responsive to stored software programs programmed with the corresponding algorithms.

In the power-limited mode of operation taught herein a lowering of the torque takes place through the torque control such that the desired value for the provided power is not exceeded. That is, this control takes advantage of the relationship that the power P to be output by the wind energy plant 10 is proportional to the speed n and torque τ. Herein, torque is also referred to as the moment of force, or moment M.

The control unit 56 determines the threshold rotational speed pertinent to the preset desired value for the power. The value of the threshold rotational speed is smaller than the rated value $n_n$ for the rotational speed. Accordingly, when the demanded power is provided in the power-limited mode of operation, the wind energy plant 50 operates at a matched rotational speed. This provides an advantage in that the rotational speed determined depending on the desired value for the moment can be selected with regard to the control of the whole wind energy plant 50. Thus, conditions of the wind energy plant 50 are avoided where torque and rotational speed are in a ratio to each other that is unfavorable for the operation of the plant 50.

The threshold rotational speed to be determined can be, for example, set proportional to the desired value of the power to be fed. Accordingly, the smaller the difference between the desired values for the power to be fed and the rated power in normal operation, the smaller will be the difference between the threshold rotational speed and the rated rotational speed.

When determining the threshold rotational speed for the power-limited mode of operation, the value of the threshold rotational speed can be set such that it corresponds to that rotational speed in the normal of operation, that is, where the wind energy plant 50 is not in the power-limited mode of operation. This results in the transition to full load operation for that value of the power pertinent to the preset power-limited desired value. Thus, departing from the characteristic curve for normal operation, as discussed in more detail hereinafter, the limiting value for the rotational speed is selected such that it corresponds to a power value in the normal operation that is matched to the preset desired value for the limited power. Accordingly, the wind energy plant 50 is operated at values for rotational speed and torque that do not unnecessarily stress the wind energy plant 50 in the power-limited operation.

Figure 2:
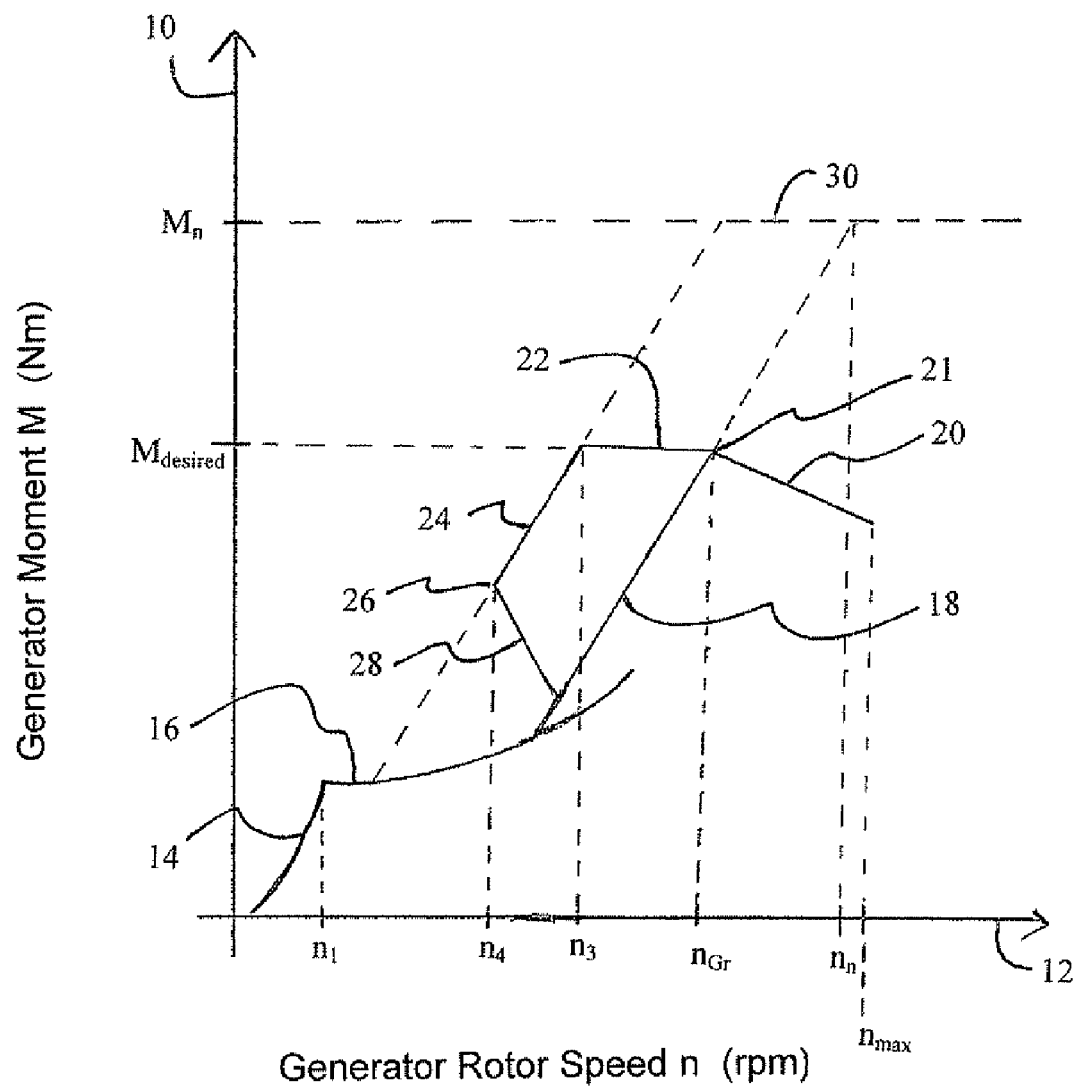
FIG. 2 is a characteristic diagram for the control behavior of the wind energy plant.

Details of this operation are best described with reference to FIG. 2. In FIG. 2, the generator moment M (axis 10) is plotted against the generator rotational speed $n_{gen}$ or n (axis 12). This characteristic diagram, or curve, can be stored in memory of the control unit 56 as two-dimensional data tables or can be implemented in whole or in part as mathematical equations. In a first starting sector 14 of this characteristic diagram, the generator moment M increases roughly linearly with the rotational speed n above a minimum cut-in speed. Thereafter, the generator moment follows a second characteristic curve sector 16 starting at rotational speed $n_1$. The second characteristic curve sector 16 indicates the generator moment M according to the ideal characteristic curve for the power received from the wind $P_{Aero}$. The mathematical relation between rotational speed n and power $P_{Aero}$ results from the following formula:

$$P_{Aero} = \left[2 \cdot \pi \cdot r_{rot} \cdot \frac{n_{gen}}{\ddot{u}_{getr}} \cdot \frac{1}{60} \cdot \frac{1}{\lambda(n_{rot})}\right]^3 \cdot \pi \cdot r_{rot}^2 \cdot \frac{\rho_{Air}}{2} \cdot c_p(n_{rot});$$

wherein $r_{rot}$ is the radius of the rotor blade 60;

$n_{gen}$ is the generator rotational speed, that is, the speed of the generator rotor 64;

$\ddot{u}_{getr}$ is the transmission ratio of the gearbox 66;

$\lambda(n_{rot})$ is the tip-speed ratio, depending from the rotational speed of the rotor 58;

$\rho_{Air}$ is the density of the air; and $c_p(n_{rot})$ is a power coefficient for the rotor blade 60, depending from the rotational speed of the rotor 58.

The above relationship for the power can be calculated continuously or can be included in a table as a function of the rotational speed n. The use of the physical relationship between the power received from the wind and the generator power ascertains that a maximum power yield is achieved with the wind energy plant in this range of the rotational speed n.

Second sector 16 of the characteristic curve is followed by sector 18 of the characteristic curve, in which a rapid increase of the torque with the rotational speed occurs. In standard operation of wind energy plant 50, torque is increased up to the rated value $M_n$ across sector 18 of the characteristic curve.

In the power limited operation, the control of wind energy plant 50 takes place according to sector 18 up to a first threshold rotational speed $n_{Gr}$. At the rotational speed $n_{Gr}$, the desired value for the moment $M_{desired}$ preset for the wind energy plant exists. The point 21 ($n_{Gr}$, $M_{desired}$) can be the point on the characteristic curve for the rotational speed and moment when changing over into the full load operation in the standard operation.

For rotational speeds greater than the first threshold rotational speed $n_{Gr}$, the torque is diminished in a subsequent characteristic curve sector 20, so that the demanded power corresponding to the torque $M_{desired}$ is met for the reduced power. Along this characteristic curve sector 20, an increase of the rotational speed up to a maximum rotational speed $n_{max}$ takes place. As shown in FIG. 2, the pitch control 52 can drive the angle of attack of the rotor blade 60 after reaching the threshold rotational speed $n_{Gr}$ such that the torque decreases linearly up to the maximum value for the rotational speed $n_{max}$.

Hysteresis can be provided in the control in the power limited operation. This means that upon abating wind, and with this decreasing rotational speed, the desired value for the moment is still kept at first even in a region smaller than the first threshold rotational speed. This part of the characteristic curve is indicated through 22. When a lower threshold rotational speed $n_3$ is reached, the torque is quickly reduced in the characteristic curve sector 24. This curve can be, but is not necessarily parallel to curve sector 18. In the torque reduction, operation follows along the characteristic curve 24, which extends into the second characteristic curve sector 16 in its imaginary continuation. However, when the torque has been sufficiently lowered along curve 24, a rotational speed increase takes place before reaching the second characteristic curve sector 16 in order to lead rotational speed and torque back to the third characteristic curve sector 18. In the example shown, leading back to the third characteristic curve sector 18 occurs when a rotational speed $n_4$ is reached along the curve 24. The point 26 indicates where the characteristic curve sector 24 passes into the characteristic curve sector 28, which curve sector 28 leads back to the third characteristic curve sector 18.

The control described permits rotational speed optimized control of the wind energy plant 50 even at powers to be generated that are smaller than the rated power of the plant 50. The wind energy plant 50 can be stably controlled even in the power-limited operation. Just in the rotational speed range around the threshold rotational speed $n_{Gr}$, the wind energy plant is reliably operated for the provided power. Unnecessarily high rotational speeds are also avoided compared to standard operation.

The characteristic curves in an inventive method of operation in the standard mode taught in co-pending U.S. Application Publication No. 2007/0154311 A1, which is assigned to the Assignee of the present application and which is incorporated herein in its entirety by reference, are drawn in FIG. 2 as characteristic curves 30 in broken lines for better overview. In the method taught therein, control of the rotational speed takes place around the value of the rated rotational speed $n_n$.

As is clear from the foregoing, the above embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for operating a wind energy plant including a generator, a rotor blade and a generator rotor coupled between the generator and the rotor blade, the wind energy plant having a rated output power value in a standard operation mode and having a power-limited operation mode, the method comprising:

setting a threshold rotational speed of the generator rotor to a value smaller than a rated value for a rotational speed, the threshold rotational speed depending on a desired value for a moment associated with a desired output power value and the desired output power value being smaller than the rated output power value; and controlling a generator torque in the power-limited operation mode below the threshold rotational speed of the generator rotor such that the desired output power value is not exceeded.

2. The method according to claim 1 wherein the threshold rotational speed is proportional to the desired output power value.

3. The method according to claim 2 wherein the threshold rotational speed corresponds to a rotor rotational speed value that results in the standard operation mode for a value for the moment corresponding to the desired value for the moment.

4. The method according to claim 3 wherein controlling the generator torque in the power-limited operation mode further comprises:

controlling an angle of attack of the rotor blade to linearly reduce torque up to a maximum value for the rotational speed after reaching the threshold rotational speed.

5. The method according to claim 4 wherein controlling the generator torque in the power-limited operation mode further comprises:

keeping a moment constant below the threshold rotational speed until reaching a third rotational speed, the third rotation speed below the threshold rotational speed; and reducing a moment when failing below the third rotational speed.

6. The method according to claim 5 wherein controlling the generator torque in the power-limited operation mode further comprises:

decreasing the rotational speed when falling below the third rotational speed until reaching the fourth rotational speed, the fourth rotational speed being lower than the third rotational speed; and raising the rotational speed upon reaching the fourth rotational speed.

7. The method according to claim 2 wherein controlling the generator torque in the power-limited operation mode further comprises:

controlling an angle of attack of the rotor blade to linearly reduce torque up to a maximum value for the rotational speed after reaching the threshold rotational speed.

8. A method according to claim 7 wherein controlling the generator torque in the power-limited operation mode further comprises:

keeping a moment constant below the threshold rotational speed until reaching a third rotational speed, the third rotation speed below the threshold rotational speed; and reducing a moment when falling below the third rotational speed.

9. The method according to claim 8 wherein controlling the generator torque in the power-limited operation mode further comprises:

decreasing the rotational speed when falling below the third rotational speed until reaching the fourth rotational speed, the fourth rotational speed being lower than the third rotational speed; and raising the rotational speed upon reaching the fourth rotational speed.

10. The method according to claim 1 wherein the threshold rotational speed corresponds to a rotor rotational speed value that results in the standard operation mode for a value for the moment corresponding to the desired value for the moment.

11. The method according to claim 1 wherein controlling the generator torque in the power-limited operation mode further comprises:

controlling an angle of attack of the rotor blade to linearly reduce torque up to a maximum value for the rotational speed after reaching the threshold rotational speed.

12. The method according to claim 11 wherein controlling the generator torque in the power-limited operation mode further comprises:

keeping a moment constant below the threshold rotational speed until reaching a third rotational speed, the third rotation speed below the threshold rotational speed; and reducing a moment when falling below the third rotational speed.

13. The method according to claim 12 wherein controlling the generator torque in the power-limited operation mode further comprises:

decreasing the rotational speed when falling below the third rotational speed until reaching the fourth rotational speed, the fourth rotational speed being lower than the third rotational speed; and raising the rotational speed upon reaching the fourth rotational speed.

14. An apparatus for operating a wind energy plant including a generator, a rotor blade and a generator rotor coupled between the generator and the rotor blade, the wind energy plant having a rated output power value in a standard operation mode and having a power-limited operation mode, the apparatus comprising:

means for setting a threshold rotational speed of the generator rotor to a value smaller than a rated value for a rotational speeds the threshold rotational speed depending on a desired value for a moment associated with a desired output power value and the desired output power value being smaller than the rated output power value; and means for controlling a generator torque in the power-limited operation mode below the threshold rotational speed of the generator rotor such that the desired output power value is not exceeded.

15. The apparatus according to claim 14 wherein the threshold rotational speed is proportional to the desired output power value.

16. The apparatus according to claim 14 wherein the threshold rotational speed corresponds to a rotor rotational speed value that results in the standard operation mode for a value for the moment corresponding to the desired value for the moment.

17. The apparatus according to claim 14 wherein the controlling means further comprises:

means for controlling an angle of attack of the rotor blade to linearly reduce torque up to a maximum value for the rotational speed after reaching the threshold rotational speed.

18. The apparatus according to claim 14 wherein the controlling means further comprises:

means for keeping a moment constant below the threshold rotational speed until reaching a third rotational speed, the third rotation speed below the threshold rotational speed; and means for reducing a moment when falling below the third rotational speed.

19. The apparatus according to claim 18 wherein the controlling means further comprises:

means for decreasing the rotational speed when falling below the third rotational speed until reaching the fourth rotational speed, the fourth rotational speed being lower than the third rotational speed; and means for raising the rotational speed upon reaching the fourth rotational speed.

20. An apparatus for operating a wind energy plant including a generator, a rotor blade and a generator rotor coupled between the generator and the rotor blade, the wind energy plant having a rated output power value in a standard operation mode and having a power-limited operation mode, the apparatus comprising:

a control unit configured to set a threshold rotational speed of the generator rotor to a value smaller than a rated value for a rotational speeds the threshold rotational speed depending on a desired value for a moment associated with a desired output power value and the desired output power value being smaller than the rated output power value; and the control unit further configured to control a generator torque in the power-limited operation mode below the threshold rotational speed of the generator rotor such that the desired output power value is not exceeded through instructions provided to a torque control of the wind energy plant.

* * * * *